United States Patent Office 3,652,696
Patented Mar. 28, 1972

3,652,696
PREPARATION OF MICROCRYSTALLINE WAXES
Sammy C. Honeycutt, Gastonia, N.C., assignor to Lithium Corporation of America, New York, N.Y.
No Drawing. Filed Sept. 4, 1970, Ser. No. 69,903
Int. Cl. C07c 15/08
U.S. Cl. 260—668 B  9 Claims

ABSTRACT OF THE DISCLOSURE

Preparation of microcrystalline waxes by the telomerization of ethylene with p-xylene in the presence of a complex of a polylithio hydrocarbon, especially a complex of a dilithio adduct of a conjugated polyene hydrocarbon with tetramethylethylenediamine or similar amine, in the presence of an aliphatic liquid hydrocarbon at a temperature of about 90 to 110° C. at an elevated pressure.

BACKGROUND OF THE INVENTION

The preparation of waxes by telomerizing ethylene in the presence of an aromatic hydrocarbon or an alkyl-aromatic hydrocarbon and a catalyst system in the form of a combination of a non-aromatic tertiary amine with alkyl- or aryllithiums is known, as is shown, for instance, in U.S. Pat. No. 3,206,519 and in Hydrocarbon Precessing, W. A. Butte, vol. 45, No. 9, September 1966, pp. 277–280. However, cost factors as well as other shortcomings detract from the desirability of such procedures.

Microcrystalline waxes are valuable products with a wide variety of applications. Their hardness and high melting point combined with their flexibility make them valuable in industry. The microcrystalline waxes on the market today are by-products of the petroleum refining process. Due to changes in the refining process, the traditional sources of microcrystalline waxes are growing smaller and an economical source of microcrystalline wax is desirable. The method to be described below provides an economical route to the production of novel synthetic microcrystalline waxes having physical properties which enable them to be used in place of and for the same and similar uses as petroleum-derived microcrystalline waxes.

SUMMARY OF THE INVENTION

In accordance with the present invention, there is provided a method of producing novel microcrystalline waxes. The microcrystalline waxes of the present invention radically differ chemically from naturally occurring microcrystalline waxes. Thus, the microcrystallines waxes of the present invention contain one benzene ring per polymer chain whereas natural microcrystalline waxes contain only traces of aromatic ring compounds; and, while the number average molecular weight of the microcrystalline waxes of the present invention and of the natural microcrystalline waxes may, in certain cases, be approximately or substantially the same, the molecular weight distribution of the natural microcrystalline waxes is very narrow whereas it is very broad in the microcrystalline waxes of the present invention.

The method involves telomerization of ethylene with, specifically, p-xylene (or mixtures of xylenes containing predominately p-xylene) and wherein the telomerization is initiated by a coordination complex of a polylithio, particularly dilithio, hydrocarbon, especially a dilithio adduct of a conjugated polyene hydrocarbon, with tetramethylethylenediamine (TMEDA) or similar amine, in the presence of an aliphatic liquid hydrocarbon at a temperature of about 90 to 110° C. at an elevated pressure.

Microcrystalline waxes can be produced in accordance with the present invention having molecular weights from about 350 to about 1200 and melting points from about 190° F. to about 280° F. Generally, about 45 pounds of wax are produced for each gram equivalent weight of lithium in the catalyst. The ethylene pressure can vary from 1 atmosphere to liquid ethylene pressure but, for economy of time and equipment, the pressure should generally desirably be from 15 to 70 atmospheres. The telomerization temperature is critical since crystallinity is a function of chain branching and chain branching is a function of temperature. Also, the temperature should be kept reasonably constant during the reaction in order to provide reproducible physical properties. The lower limit of temperature is about 90° C. At temperatures above 110° C., catalyst decomposition is rapid and low yields of wax are usually obtained. In practice the temperature should be held reasonably constant at some level in the range of from about 90 to about 110° C. with a range of about 95 to about 105° C. being particularly advantageous.

While, as shown in the aforementioned patent and article, various aromatic or alkyl-aromatic hydrocarbons when telomerized with ethylene will produce waxes, including benzene, toluene, xylene, ethylbenzene, n-propylbenzene, isopropylbenzene, etc., it has been found, among other discoveries, in accordance with the present invention, that p-xylene is unexpectedly effective. Benzene, for instance, when telomerized with ethylene, produces a hard and brittle wax the properties of which are quite dissimilar to the properties of microcrystalline waxes. Moreover, the yields of waxes using benzene as a telogen are radically less than when p-xylene is employed, and low yields of waxes are obtained when other aromatic hydrocarbons or alkyl-aromatic hydrocarbons are utilized as the telogen, as is shown by the following Table I. In said Table I, $\bar{X}_T$ represents the mole fraction of telogen utilized, T is temperature in degrees C. and P is pressure in pounds per square inch used in the telomerization reaction.

TABLE I

| Telogen | $\bar{X}_T$ | T | P | Yield [1] |
|---|---|---|---|---|
| Toluene | 1.0 | 100 | 800 | 10,000 |
| Ethylbenzene | 1.0 | 100 | 990 | 13,000 |
| Benzene | 1.0 | 100 | 800 | 2,200 |
| m-Xylene | 1.0 | 100 | 700 | 9,650 |
| o-Xylene | 1.0 | 100 | 650 | 13,000 |
| 5° xylene | 1.0 | 100 | 700 | 12,500 |
| p-Xylene | 1.0 | 100 | 690 | 27,200 |

[1] Grams wax/gram equivalent weight Li in catalyst.

It has also been found that the yield of microcrystalline wax increases essentially in a regular fashion as the p-xylene concentration is increased, as is shown below in Table II.

TABLE II

Telomerization temperature—100° C.

| $\bar{X}_T$ | Yield g. wax/g. eq. wt. Li in catalyst |
|---|---|
| 0.08 | 3,640 |
| 0.09 | 9,720 |
| 0.22 | 12,500 |
| 0.26 | 16,000 |
| 0.34 | 14,500 |
| 0.50 | 18,800 |
| 0.53 | 19,000 |
| 0.66 | 15,000 |
| 0.73 | 19,500 |
| 1.00 | 27,200 |

The increase in yield is believed to be due to the fact that p-xylene is a better solvent for the microcrystalline wax than is hexane or such other aliphatic liquid hydrocarbon which is used in the telomerization reaction and perhaps also because the microcrystalline waxes produced at high p-xylene concentration are lower molecular weight and therefore more soluble. The most generally accepted test for determining microcrystallinity is the one devised by Kinsel and Phillips [1] where the percent contraction is measured in cooling the wax from 10° F. above the melting point to 50° F. below the melting point. In this system of classification waxes having total percent contraction less than about 13 are classified as microcrystalline. As shown in the following Table III, microcrystalline waxes were obtained using p-xylene and carrying out the reaction at 100° C. Waxes prepared at 75° C. were not microcrystalline. The low viscosity values shown in Table III for microcrystalline waxes also indicate a low polyethylene content (high M.W.). Polyethylene is an undesirable component of these waxes and raises the melt viscosity of these waxes considerably.

TABLE III.—TELOMERIZATION TEMPERATURE—100° C.

| $\overline{X}_T$ | P, p.s.i. | M.P. (°F.) | $\overline{M}_n$ | Percent contraction | Viscosity (S.U.S.) at 300° F |
|---|---|---|---|---|---|
| 0.22 | 900 | 236 | 1,040 | 6.5 | 81.9 |
| 0.25 | 800 | 232 | 880 | 9.5 | 70.6 |
| 0.34 | 1,000 | 226 | 600 | 5.8 | 31.6 |
| 0.48 | 860 | 217 | 550 | 3.9 | 44 |
| 0.50 | 1,000 | 206 | 400 | 5.9 | 14.4 |
| 0.53 | 880 | 235 | 750 | 5.5 | 48.5 |
| 0.66 | 550 | 201 | 400 | 5 | 13.3 |
| 0.73 | 470 | 199 | 370 | 3.3 | 8.8 |
| 0.85 | 700 | 203 | 350 | 3.3 | 10.3 |
| 1.00 | 690 | 190 | 360 | 3.4 | 8.5 |

TELOMERIZATION TEMPERATURE—75° C.

| 0.28 | 600 | 238 | | 15.5 | |
| 0.51 | 450 | 210 | | 14 | |

The polylithio adducts of conjugated polyene hydrocarbons include, by the way of illustration, dilithioisoprene, dilithiobutadiene, and dilithio adducts of other polyene hydrocarbons as shown, for instance, in U.S. Pat. No. 3,338,178. Other polylithio hydrocarbons which can be used are 1,4-dilithiobutane; 1,5-dilithiopentane; and alkylenedilithiums. It is, however, especially desirable to use dilithio adducts of such conjugated polyene hydrocarbons as isoprene and 1,3-butadiene.

The molecular weights of the microcrystalline waxes can be varied over a relatively wide range by varying the three parameters of temperature, pressure and p-xylene concentration. Practically, the molecular weights so obtained vary from about 350 to about 1200. Generally speaking, the preferred microcrystalline waxes made pursuant to the present invention fall into three grades the properties of which are set forth below in Table IV in relation to the ranges of their molecular weights.

TABLE IV

| $\overline{M}_n$ | 300–450 | 450–700 | 700–1,000 |
|---|---|---|---|
| Physical state | Soft white solid. | Medium soft white solid. | Hard white solid. |
| Viscosity (300° F.) S.U.S. | 5–20 | 20–50 | 50–100. |
| Melting point, °F | 175–210 | 210–230 | 230–250. |
| Percent contraction | 2–5 | 4–7 | 7–10. |

While TMEDA is especially satisfactory for use in the practice of the present invention, other similar aliphatic tertiary amines can be utilized among which may be mentioned azaoxa-alkanes, aza-alkyloxacycloalkanes or oxa-alkylazacycloalkanes which can be represented by the formulae:

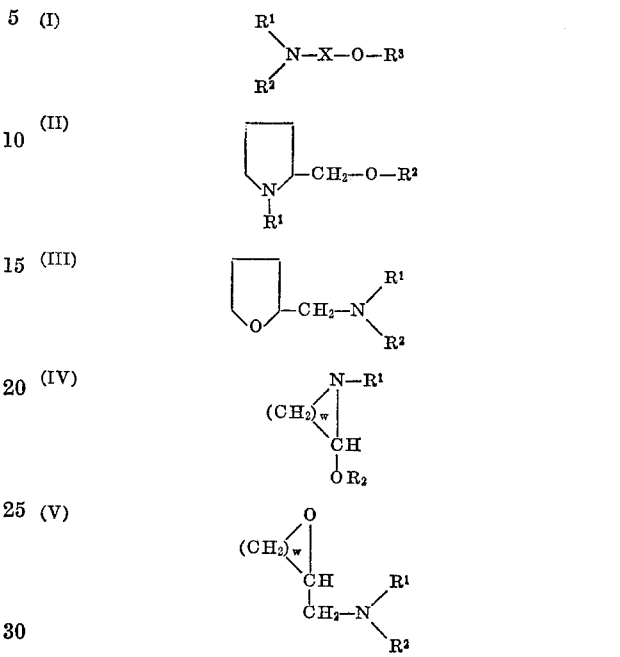

where $R^1$, $R^2$ and $R^3$ are the same or different alkyls each containing from 1 to 4 carbon atoms, namely, methyl, ethyl, n-propyl, isopropyl, n-butyl, isobutyl and t-butyl; X is a non-reactive group such as $-CH_2-CH_2-$, $-CH_2-CH_2-CH_2-$, $$-CH_2-CH-CH_2-$$
$$\phantom{-CH_2-}CH_3$$

or other divalent aliphatic hydrocarbon or alkylene radicals, preferably containing from 2 to 4 carbon atoms; and w is 1 to 4. Illustrative examples include, for instance, 2-dimethylaminoethylmethyl ether $$[(CH_3)_2-N-CH_2-CH_2-O-CH_3]$$

2-diethylaminoethylmethyl ether $$[(C_2H_5)_2-N-CH_2-CH_2-O-CH_3]$$

and 2-dimethylaminopropylmethyl ether $$[(CH_3)_2-N-CH_2-CH_2-CH_2-O-CH_3]$$

The TMEDA and similar aliphatic tertiary amines are disclosed in U.S. Pat. No. 3,451,988, notably in column 4, lines 39–75 and column 5, lines 1–33, the disclosure with respect to which is incorporated herein by reference. Such aliphatic tertiary amines, as there disclosed, include, among others, those which are represented by the formulae:

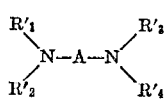

and

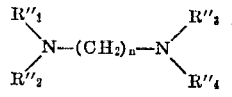

where $R'_1$, $R'_2$, $R'_3$ and $R'_4$ are the same or different alkyl radicals of 1 to 4 carbon atoms, inclusive; A is a non- ---
[1] Anthony Kinsel and Joseph Phillips, Ind. Eng. Chem., 17, 152 (1945).

reactive group; $R''_1$, $R''_2$, $R''_3$ and $R''_4$ are the same or different alkyl radicals of 1 to 3 carbon atoms, inclusive, and $n$ is an integer between 1 and 4, inclusive.

The aliphatic (including cycloaliphatic) liquid hydrocarbon solvents which are utilized include, by way of illustration, n-pentane, isopentane, n-hexane, n-heptane, n-octane, isooctane, cyclopentane, cyclohexane, cyclooctane, and the like.

The proportions of the ingredients utilized in the carrying out of the method of the invention are variable. The amount of ethylene utilized in relation to the p-xylene will depend upon the desired molecular weight or molecular weight range of the microcrystalline wax. The polylithio hydrocarbons, notably the dilithio adducts of the conjugated polyene hydrocarbons, will, in all cases, be present in small proportions in relation to the amount of p-xylene and the same is true of the TMEDA or similar aliphatic tertiary amine. The aliphatic liquid hydrocarbon solvent provides a reaction medium and acts as a solvent for the coordination complex catalyst. It may be present in greater or lesser amounts than the p-xylene, depending upon the desired molecular weight or molecular weight range of the microcrystalline wax, as shown in Table II.

In certain instances, the reaction mixture may contain small proportions of ethers as where, for instance, the ether is present in the solution of the polylithio adduct of the conjugated polyene hydrocarbon, as said adduct is produced. Dimethyl ether as well as other ethers may be employed, as shown, for example, in the aforementioned U.S. Pat. No. 3,388,178. Ethers, however, are not an essential ingredient of the reaction mixtures used in the practice of the present invention.

The following specific examples are given as illustrative but in no way limitative of the practice of the invention. It will be understood that numerous other examples will readily occur to those skilled in the art in the light of the novel guiding principles and teachings disclosed herein. In these particular examples, the method was carried out in a stirred 1-gallon autoclave. All of the reactants were utilized in highly purified form. Molecular weights of the waxes were determined by vapor pressure osmometry using toluene as the solvent at 65° C. Melting points of the waxes were determined according to ASTM D-127. Their percent contraction was determined according to the method of Kinsel and Phillips referred to above.

EXAMPLE I

Preparation of a low molecular weight microcrystalline wax 1360 g. of p-xylene and 200 g. of n-hexane were placed in an autoclave, 15 ml. of TMEDA was added and the autoclave sealed. The reaction mixture was saturated with ethylene for about 15 minutes and the gases vented. Then 50 ml. of a 1 N solution of a dilithio adduct of isoprene in benzene-dimethyl ether was injected into the autoclave and the autoclave repressurized with ethylene to 700 p.s.i. (cylinder pressure) and heated to 100° C. The temperature was kept at 100° C. during the exothermic reaction by circulating water through the coils in the autoclave. When the reaction was complete (about 2 hours), the autoclave was allowed to cool and vented. The reaction mixture was removed from the autoclave, placed in a resin kettle and distilled to 150° C. to remove p-xylene, solvent and TMEDA. Since the catalyst residue and other impurities settle to the bottom of the molten wax product, the wax was purified by simply decanting it away from these impurities. 1065 g. of a soft white wax was obtained corresponding to a yield of 21.3 kg. per equivalent of the lithium catalyst. The product possessed a number average molecular weight of 350 and a melting point of 95° C. The percent contraction was 3.3 and the viscosity at 300° F. in SUS units was 10.3.

EXAMPLE II

Preparation of a medium molecular weight microcrystalline wax

The above run was repeated using the same reagents and reaction conditions except that 813 g. of p-xylene and 696 g. of n-hexane were employed. 1450 g. of a medium soft, white wax was obtained corresponding to a yield of 29 kg. per equivalent of lithium catalyst. The product possessed a $\overline{M}_n$ of 550 and a melting point of about 103° C. The percent contraction was 3.9 and the viscosity at 300° F. in SUS units was 44.

EXAMPLE III

Preparation of a high molecular weight microcrystalline wax

The run of Example I was repeated using the same reagents and reaction condiitons except that 368 g. of p-xylene and 1040 g. of n-hexane were employed. 625 g. of a hard, white wax was obtained corresponding to a yield of 12.5 kg. per equivalent of lithium catalyst. The product possessed an $\overline{M}_n$ of 1040 and a melting point of about 113° C. The percent contraction was 6.5 and the viscosity at 300° F. in SUS units was 82.

What is claimed is:

1. A method of producing microcrystalline waxes which comprises contacting ethylene with (a) p-xylene and with (b) a polylthio hydrocarbon, in the presence of a tertiary aliphatic polyamine, in an aliphatic liquid hydrocarbon medium, at a temperature in the range of about 90 to 110° C. and at a pressure of least 15 atmospheres.

2. A method according to claim 1, wherein the polylithio hydrocarbon is a dilithio adduct of a conjugated polyene hydrocarbon.

3. A method according to claim 1, wherein the tertiary aliphatic polyamine is tetramethylethylenediamine.

4. A method according to claim 2, wherein the tertiary aliphatic polyamine is tetramethylethylenediamine.

5. A method according to claim 1. wherein the polylithio hydrocarbon is a member selected from the group dilithioisoprene and dilithiobutadiene.

6. A method according to claim 4, wherein the conjugated polyene hydrocarbon of said dilithio adduct is a member selected from the group of isoprene and 1,3-butadiene.

7. A synthetic microcrystalline wax, in the form of a soft, white solid having an average molecular weight in the range of 300 to 450, a viscosity (300° F.) of 5 to 20 SUS, a melting point in the range of 175 to 210° F., and a contraction of 2 to 5%, and resulting from contacting ethylene with (a) p-xylene and with (b) a polylithio hydrocarbon, in the presence of a tertiary aliphatic polyamine, in an aliphatic liquid hydrocarbon medium, at a temperature in the range of about 90 to 110° C. and at a pressure of at least 15 atmospheres.

8. A synthetic microcrystalline wax, in the form of a medium soft, white solid having an average molecular weight in the range of 450 to 700, a viscosity (300° F.) of 20 to 50 SUS, a melting point in the range of 210 to 230° F., and a contraction of 4 to 7%, and resulting from contacting ethylene with (a) p-xylene and with (b) a polylithio hydrocarbon, in the presence of a tertiary aliphatic polyamine, in an aliphatic liquid hydrocarbon medium, at a temperature in the range of about 90 to 110° C. and at a pressure of at least 15 atmospheres.

9. A synthetic microcrystalline wax, in the form of a hard, white solid having an average molecular weight in the range of 700 to 1000, a viscosity (300° F.) of 50 to 100 SUS, a melting point in the range of 230 to 250° F., and a contraction of 7 to 10%, and resulting from contacting ethylene with (a) p-xylene and with (b) a polylithio hydrocarbon, in the presence of a tertiary aliphatic polyamine, in an aliphatic liquid hydrocarbon medium, at a temperature in the range of about 90 to 110° C. and at a pressure of at least 15 atmospheres.

References Cited

UNITED STATES PATENTS

| | | | |
|---|---|---|---|
| 3,206,519 | 9/1965 | Eberhardt | 260—668 |
| 3,458,586 | 7/1969 | Langer | 260—668 |
| 3,458,586 | 7/1969 | Langer | 260—668 |
| 3,468,970 | 9/1969 | Screttas | 260—668 |
| 3,474,143 | 10/1969 | Butte | 260—94.9 |
| 3,567,703 | 3/1971 | Eberhardt | 260—94.9 |

CURTIS R. DAVIS, Primary Examiner

U.S. Cl. X.R.

260—94.9